United States Patent [19]
Arifov et al.

[11] 3,919,742
[45] Nov. 18, 1975

[54] COTTON SEED DELINTING MACHINE

[76] Inventors: Ubai Arifovich Arifov, Observatorskaya ulitsa, 85; Dmitry Efimovich Kharmats, Bolskaya Mirabadskaya ulitsa, 119; Gafur Abdushukurovich Abdurashidov, TS-13, 21, kv. 29; Gennady Andreevich Leontiev, Armavirskaya ulitsa, 1; Jury Vladimirovich Zhegallo, massiv Vysokovoltny, 122, kv. 21; Eduard Simkhovich Parilis, proezd Morozova, 1/9, kv. 21; Alexandr Vasilievich Vzenkonsky, TS-2, 6, kv. 16; Anatoly Dmitrievich Sapon, TS-2, 15, kv. 25; Vladimir Fedorovich Lavnikanis, ulitsa lenina, 16; Mark Iosifovich Kogan, ulitsa Botkina, 1, kv. 14; Nikolai Petrovich Egorov, ulitsa 7 topolei, 4; Abuzar Gabdurakhmanovich Shaidullin, kvartal, 6, 26 kv. 13, all of Tashkent, U.S.S.R.

[22] Filed: Oct. 9, 1973

[21] Appl. No.: 404,734

Related U.S. Application Data
[63] Continuation of Ser. No. 259,833, June 5, 1972, abandoned.

[52] U.S. Cl. .................................................. 19/41
[51] Int. Cl.² ............................................ D01B 1/02
[58] Field of Search .................................. 19/40–47

[56] References Cited
UNITED STATES PATENTS

| | | | |
|---|---|---|---|
| 440,282 | 11/1890 | Sears et al. ........................ 19/40 X |
| 546,276 | 9/1895 | Faulkner ............................... 19/42 |
| 1,020,787 | 3/1912 | White et al. ........................... 19/43 |
| 1,669,771 | 5/1928 | Mitchell et al ......................... 19/40 |

*Primary Examiner*—Dorsey Newton
*Attorney, Agent, or Firm*—Holman & Stern

[57] ABSTRACT

A machine comprising saw cylinders which are enclosed in a housing consisting of three sections, i.e., a lower section and two side sections. The left-hand side section of the housing together with the left-hand saw cylinder are made to form a first seed chamber, whereas the lower section of the housing together with both cylinders are made to form a second seed chamber adjacent to the first chamber, and the right-hand section of the housing together with the right-hand cylinder are made to form a third seed chamber adjacent to the second seed chamber. Provision of three seed chambers substantially improves the seed delinting efficiency. The machine also incorporates a cleaning means to perform cleaning of the lint after its removal from the seeds.

8 Claims, 7 Drawing Figures

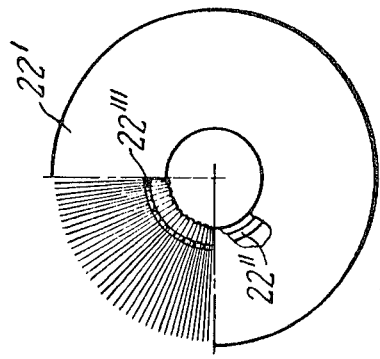
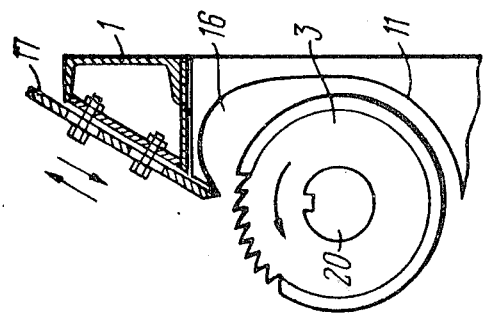

COTTON SEED DELINTING MACHINE

This application is a continuation of application Ser. No. 259,833, filed June 5, 1972, now abandoned.

BACKGROUND OF THE INVENTION

The present invention relates generally to cotton plant treating equipment and more particularly, to cottonseed delinting machines.

The invention can be realized most efficiently when employed to obtain a short-stapled lint used for the production of high-quality cotton cellulose and also to delint cottonseeds intended for sowing.

Known in the art are cottonseed delinting machines consisting of having two sections, each housing two brush cylinders which are enclosed in a screen shroud to which a lint discharging chamber is directly adjacent (cf., e.g., USSR Author's certificate No 151,426, Cl., 29a, 1). Delinting of seeds in these machines takes place due to the interaction action of the brush cylinders and a dense layer of seeds, while the lint is discharged through the screen shroud due to a vacuum established inside the lint-discharge chamber by a fan.

In these machines the screen surface of the shroud is not favorable for the timely removal of the lint from the machine which results in a rubbing of the lint and reduction of its staple length, while the long lint filaments are rolled up to form undesirable clots.

Also known in the art are saw linters operating on the principle of a saw gin. These linters are efficient only to remove lint with the length of filaments on seeds that are not over 6 mm. When a deeper removal of lint is necessary, i.e., the length of filaments on seeds being less than 6 mm, the efficiency of these linters is sharply reduced because the lint removal occurs mainly due to the scraping of the lint from the seed surface, instead of catching the filaments by the saw tooth and consecutive tearing them away from seeds. Also, the known linters are not able to yield quality lint, as the lint cleaning means are not incorporated therein, and in actual practice the cleaning process is performed by other machines and devices which make the attendance more difficult.

SUMMARY OF THE INVENTION

It is a principal object of the present invention to provide a cottonseed delinting machine with a high productive capacity amounting to 1000–1500 kg/hr (seed) and a high lint removal efficiency of up to 10 percent of the seed weight.

It is an important object of the present invention to provide a machine capable of effectively cleaning the lint from the waste directly after lint removal, i.e., when waste impurities are still remaining in a passive state and not intruded deep into the lint filaments.

It is one more object of the present invention to provide a machine which is reliable in operation and convenient in attendance.

It is also an object of the present invention to provide a machine permitting lint to be obtained from cottonseeds used for technical purposes and from those used for sowing.

These and other objects are achieved by providing a cotton seed delinting machine according to the invention, wherein the housing comprises three sections: a lower section and two side sections, the left-hand side section of the housing together with a cylinder in the left-hand section being made to form a first seed chamber along the entire length of the cylinder, said chamber being wedge-shaped in the cross section which is narrowing in the direction of seed flow, the lower section together with two cylinders are made to form a second seed chamber being adjacent to the first chamber, while the right-hand side section of the housing together with the cylinder in the right-hand section are made to form a third seed chamber along the entire length of the cylinder, said latter chamber being widened in its top portion to form a longitudinal duct of a semi-circular section, whereas the right-hand side section is provided at the bottom with a cylindrical surface which is coaxial to the surface of the right-hand cylinder, while a clearance is provided between said surfaces, said clearance being within the limits of 1.5 to 2 seed diameters, said longitudinal duct is provided with an open top outlet for the partly delintered seeds and the lint.

In order to ensure a more intensive removal of the lint, it is expedient that provision be made in the middle of the lower section of the housing, for a triangular longitudinal projection adapted for biasing the seed flow towards the cylinders.

It is expedient, for the purpose of regulating the delinting process, to install a flat damper above the right-hand cylinder and along its generant, said damper being able to extend into the open outlet of the longitudinal duct and to displace in its plane a variation in the cross-sectional area of the seed and lint outflow at their discharge into a separating chamber.

For a partial removal of waste impurities from seeds and lint, it is expedient that the lower section of the housing of the second seed chamber be made of a perforated steel sheet.

In order to improve servicing conditions, it is expedient that axles be provided parallel to the cylinder shafts and below them. Pivoted on said axles are the side sections of the housing which are capable of turning for the purpose of servicing the cylinders, whereas below said axles a provision is made for mounting counterweights which are to be connected to said axles.

When delintered sowing seeds are to be obtained, it is expedient to employ metal brushes to function as the lint removing elements of the cylinders.

When seeds for technical purposes are to be obtained, it is expedient to employ circular saws to function as the lint-removing elements of the cylinders.

To effect intensive blending of seeds, it is expedient that gaskets be provided which between the circular saws are corrugated on their external perimeter surface, whereas the outer diameter of corrugations is equal to the diameter of the saw tooth recess circle, while the depth of corrugations is equal to a maximum seed diameter.

High-quality lint can be obtained by providing a lint cleaning means which is installed above the lint separating chamber.

Effective separation of seeds and free lint, in the course of their discharging into the separating chamber, can be achieved by providing two compartments in said chamber, the left-hand compartment having its top portion shaped in the form of a helix snail, while the right-hand compartment incorporates a diffuser which is mounted adjacent to the open outlet of the longitudinal duct in such a way that a slot is formed along the entire length of the right-hand cylinder for the intake of air from the outside, said slot being made adjustable.

BRIEF DESCRIPTION OF THE DRAWINGS

In order that the invention may be more clearly understood, a specific embodiment will now be described with reference to the accompanying drawings, in which:

FIG. 2a is a view of the cylinders having brushes which serve as the lint-removing element.

FIG. 2b is a fragmentary, vertical sectional detail view.

DETAILED DESCRIPTION OF THE PREFERRED EMBODIMENT

Figure 1:
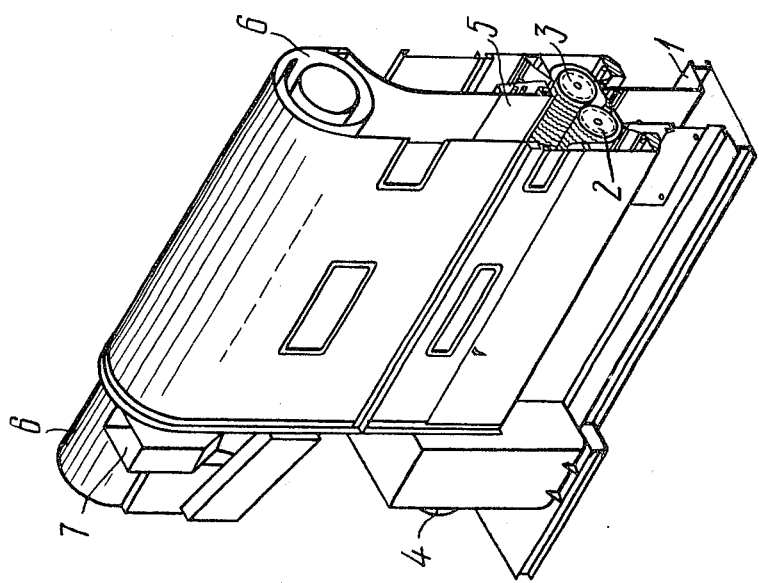
FIG. 1 is a general view of the machine, according to the present invention.

A cottonseed delinting machine incorporates a frame 1 (FIG. 1) carrying saw cylinders 2 and 3 which are imparted rotation from an electric motor 4; a chamber 5 to separate the lint from the seeds, being mounted on the frame 1 above the cylinders 2 and 3; and a pneumatic separator 6 for lint cleaning which is installed directly above the chamber 5, whereas the seeds are delivered to the cylinders from a feeder 7 mounted on the side of the frame 1.

Figure 2:
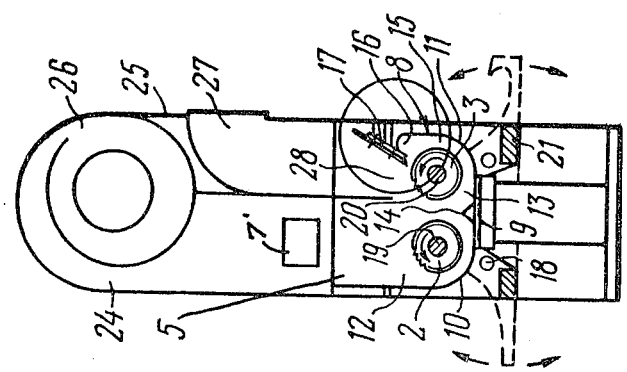
FIG. 2 is a cross-sectional view of the machine disclosed herein.

The saw cylinders 2 and 3 (FIG. 2) are enclosed in a housing 8 which comprises three sections, namely, a lower section 9 and two side sections which are a left-hand section 10 and a right-hand section 11. The left-hand side section 10 of the housing 8 together with the cylinder 2 are made to form a first seed chamber 12 along the entire length of the cylinder, said chamber being wedge-shaped in the cross section which is narrowing in the direction of seed flow. The lower section 9 of the housing 8 together with the both cylinders 2 and 3 are made to form a second seed chamber 13 which is adjacent to the first one and incorporates at its bottom a triangular longitudinal projection 14 made in the lower section of the housing 8 said projection 14 serving for biasing the seeds towards the cylinders to ensure a more intensive removal of the lint. The right-hand side section 11 of the housing 8 together with the right-hand cylinder 3 are made to form a third seed chamber 15 which is adjacent to the second chamber and incorporates in its top portion a widening 16 shaped in the form of a longitudinal duct of a semi-circular section to create a dense layer of seeds for ensuring the efficient removal of lint.

The right-hand side section 11 is provided at the bottom with a cylindrical surface coaxial to the surface of the cylinder 3, whereas a permanent clearance is left between said surfaces, and has a value between 11 to 15 mm. Said clearance limits have been defined with the purpose to provide for a minimum crushing of seeds and the efficient removal of lint.

The longitudinal duct is given an open upper outlet for the partly delintered seeds and lint, said outlet incorporating a flat damper 17 which is installed above the cylinder and along its generant. The damper may be displaced along its plane to vary the cross-sectional area of the seed and free lint outflow at their discharging into the separating chamber 5.

For convenient servicing of the cylinders, the side sections 10 and 11 of the housing 8 are pivoted on axles 18 which are installed in parallel to and below the shafts 19 and 20 of the cylinders 2 and 3, this permits the side sections to be turned. An effort required for turning the side sections is substantially reduced due to the provision of counterweights 21 connected to the axles 18.

Figure 3:
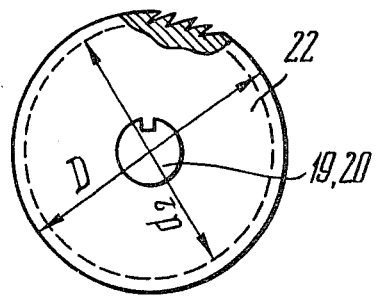
FIGS. 3 and 4 are enlarged-scale views of the saw disk and the gasket.
Figure 4:
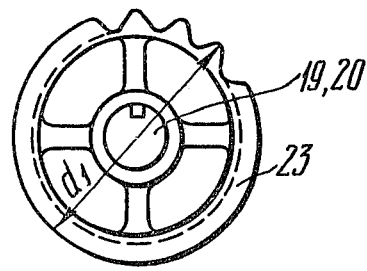

The saw cylinders are composed of circular saws 22 (FIG. 3) mounted on the shafts 19 and 20, said saws being spaced by means of gaskets 23 (FIG. 4) which are corrugated on their external perimeter surface, wherein the diameter $d_1$ of the gasket perimeter is equal to the diameter $d_2$ of the saw tooth recess circle, while the depth of corrugations is equal to 7–7.5 mm. Provision of the gaskets with the perimeter corrugations of a depth equal to a maximum seed diameter ensures the efficient delinting of seeds and prevents the latter from lodging in the inter-saw spaces.

The chamber 5 (FIG. 2) comprises two compartments 24 and 25, of which the left-hand compartment 24 in its top portion is shaped as a helix snail 26, while the right-hand compartment 25 incorporates a diffuser 27. The latter is adjacent to the open outlet of the longitudinal duct so that a slot 28 is formed along the entire length of the cylinder 3 for the intake of air from the outside. Provision is made for adjusting the slot to create an air flow inside the chamber 5 said air flow, possessing a velocity which is necessary to separate the lint from the seeds which are discharged by the cylinder 3. The slot adjustment can be performed by any suitable means known in the art, i.e., by a damper or the like.

Figure 5:
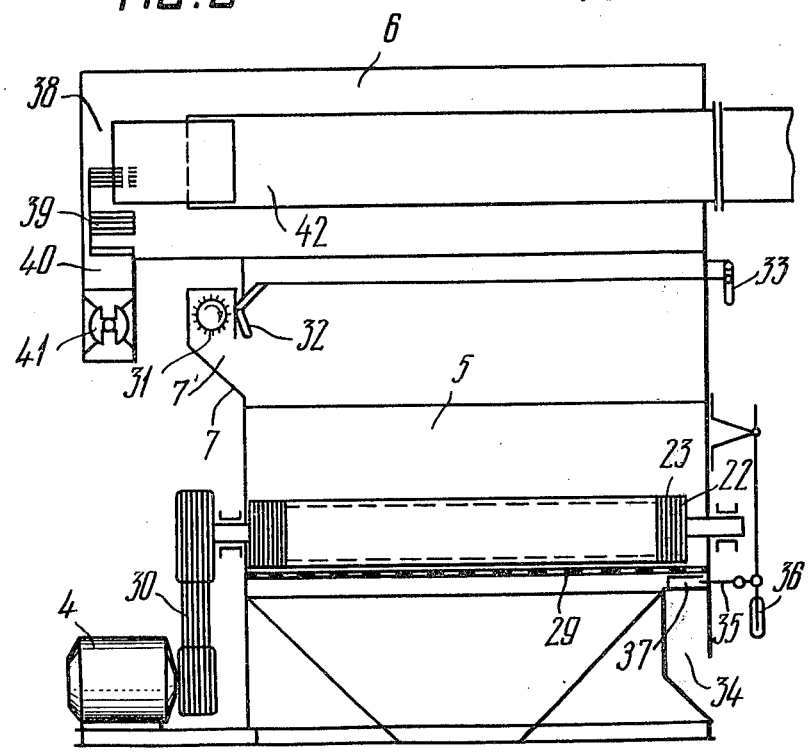
FIG. 5 is a longitudinal-section view of the machine, according to the present invention.

For the partial removal of waste impurities from the seeds and lint, the lower section 9 of the housing 8 in the second seed chamber 13 is made of a perforated steel sheet 29 (FIG. 5).

The cylinders 2 and 3 are driven in one direction by an electric motor 4 through a V-belt drive 30.

The feeder 7 comprises a constant-speed rotating cylinder 31 and a flap 32 which is capable of forcing the seeds towards the cylinder 31. The flap can be turned by means of a handle 33 for varying the amount of seeds delivered through the outlet 7' of the feeder 7. Opposite to the feeder 7, the second seed chamber, at its bottom portion contains a trough 34 to bring out the delintered seeds.

The amount of delintered seeds brought out of the machine can be varied by means of a damper 35 actuated by a handle 36 by way of closing or opening a port 37 which is communicable with the trough 34.

The pneumatic separator 6 incorporates a waste separating chamber 38 with bars 39, a waste collecting chamber 40, and a slide gate 41 said waste being disposed of through said slide gate 41 The cleaned lint is removed via a pipeline 42.

When seeds are needed which are suitable for sowing, the brush cylinders may be installed instead of the saw cylinders.

It is expedient to use cylindrical metal brushes as delinting members to delint cotton seeds intended for sowing. In that case, the cylinder comprises a set of disk brushes 22' (FIG. 2a) mounted on shafts 19 and 20, each of the brushes including a metal ring 22 encompassed radially by a plurality of metal strands, such as steel wires, held together by fixing means 22'''.

The cottonseed delinting machine operates in the following manner. For lintering, seeds are brought into the feeder 7. The feeding rate is adjusted by varying the clearance between the cylinder 31 and the flap 32. When brought into contact with the unidirectional rotating saw cylinders 2 and 3, seeds are carried by said cylinders over an oval trajectory which is enveloping both cylinders. At the same time, the moving mass of seeds fills the three chambers 12, 13 and 15 on the sides and underneath the cylinders to form three packing zones. In the course of filling the chambers, the seeds keep moving in the axial direction due to their ability to flow when being intensively agitated, as is characteristic of any loose material. Due to this phenomenon, the mass of seeds found in the working chamber performs a spiral-like motion, while simultaneously being periodically effected by the intensive action of the saws in the packing zones. During a single turn in this motion the seed flow comes under the effect of the saws three times, wherefrom it is discharged from a space below to a pressing damper 17 into a rarefaction zone, wherein the free lint is winnowed from seeds. The air flow induced in the chamber 5 due to an external draught generator, is utilized to winnow the discharging mass and then carries the lint upwards, while seeds and large waste impurities are returned back into the first seed chamber 12.

The lint is raised upwards and is delivered via the spiral snail 26 into the waste separating chamber 38, wherein it performs rotary motion. Before entering the pipeline 42, the lint particles due to the effect of centrifugal force, execute a number of revolutions along the perimeter of the waste separating chamber. During this process, when the lint passes through the bars 39, the waste impurities are trapped and lead out from the machine by way of the slide gate 41. Cleaned lint is taken out via the outflow pipeline 42 into a common lint collecting system (a cyclone, or the like).

The extent of lint removal from the seeds depends on the density of seeds in the chambers 12, 13 and 15 and on the duration of seed treatment in the machine. The first condition is determined by the value of the clearance between the damper 17 and the right-hand saw cylinder 3. The duration of seed treatment in the machine is determined by the amount of the aperture area of the port 37 which is controlled by means of the damper 35. The larger the aforesaid aperture, the faster the seeds outflow therefrom and, consequently, the higher the axial velocity of seed motion along the machine.

When the seed flow moves along the screen bottom of the second working chamber 13, large waste impurities are filling out from the seed mass, thus contributing to a lesser lint contaimination. To prevent air ingress from the room, the diffuser 27 of the cmpartment 25 of the chamber 5 can be connected to a plenum system to effect the intake of air from outside the room.

What we claim is:

1. A cotton seed delinting machine comprising: a frame having cylinders which are mounted on said frame one opposite from the other and which are capable of unidirectional rotation, said cylinders bearing on their surface lint-removing elements capable of acting upon seed to remove lint therefrom during rotation of said cylinders; a means for feeding seeds to said cylinders, said means being mounted on the side of said frame; a means for imparting rotation to said cylinders; a housing enclosing said cylinders, said housing consisting of three sections; including a lower section, a left-hand section and a right-hand section, one of said cylinders being mounted on the left-hand section of the housing and forming together therewith a separate seed chamber along the entire length of the cylinder, said chamber being wedge-shaped in the cross section and narrowing in the direction of flow of seeds conveyed by said rotating cylinders; said cylinders and the lower section of said housing forming together a second seed chamber which is adjacent to said first chamber; the second of said cylinders being mounted in the right-hand section of said housing and forming together therewith a third seed chamber along the entire length of the cylinder, said third chamber being adjacent to the second chamber and incorporating in its top portion a widening shape in the form of a longitudinal duct of a semi-circular section to create a dense layer of seeds; said duct having an open upper outlet for the lint and seeds being delinted; said right-hand side section of the housing of said third seed chamber incorporating at the bottom an integral cylindrical surface coaxial to the surface of the second cylinder and having a clearance between said surfaces set within the limits of from 11 to 15 mm; a chamber for a complete separation of lint from seeds located above said cylinders for recieving the lint and seeds being delinted; and a trough for discharging delinted seeds located on said frame on the side opposite to a seed feeding means.

2. A machine as claimed in claim 1, wherein said lower section of said housing is provided in its middle portion with a longitudinal triangular projection for biasing the seed flow towards said cylinders.

3. A machine as claimed in claim 1, wherein a flat damper is installed above said second cylinder and along its generating line and extends into the open outlet of said longitudinal duct, said damper being adapted to be displaced along its plane for varying the cross-sectional area outlet section of the flow of the seeds and removed lint at their discharge into said separating chamber.

4. A machine as claimed in claim 1, wherein metal brushes are provided as the lint-removing elements of said cylinders.

5. A cotton seed delinting machine comprising a frame and two cylinders mounted on said frame one opposite the other and capable of rotating in one direction, said cylinders having on their surface teeth for engaging seeds to remove lint therefrom during rotation of said cylinders; means to feed seeds to said cylinders, said means being mounted on the side of said frame; means to impart rotation to said cylinders from a motor; a housing enclosing said cylinders and consisting of three sections, including a lower section, a left-hand section and a right-hand section, one of said cylinders being installed in the left-hand section of said housing and forming therewith a separate seed chamber extending along the length of the cylinder, said chamber being wedge-shaped in cross-section and converging in the direction of the flow of seeds conveyed by said rotating cylinders; said cylinders and the lower section of said housing forming a second seed chamber adjoining said first chamber; the second of said cylinders being mounted in the right-hand section of said housing and defining together therewith a third seed chamber extending along the length of cylinder, said third chamber adjoining said second chamber and widening in its top portion to define a longitudinal duct of semi-circular cross-section to produce a dense layer of seeds, said duct having an open upper outlet to discharge lint and delinted seeds; said right-hand side section of the housing of the third seed chamber having in its bottom portion a continuous cylindrical surface coaxial to the surface of the second cylinder and a clearance between said surfaces within 11 to 15 mm wide; means to turn said left-hand and right-hand sections, when the machine is being serviced, said means including axles bearing said sections of the housing pivoted thereto, said axles being mounted on said frame below and parallel to said cylinders; a chamber for a complete separation of lint from seeds, said chamber being disposed above said cylinders to receive lint and seeds being delinted; and a trough to discharge delinted seeds, said trough being disposed on said frame on the side opposite to said means to feed seed.

6. A cottonseed delinting machine comprising: a frame, saw cylinders mounted on said frame one opposite the other and rotating unidirectionally for removing the lint from the seeds; a means for feeding seeds to said cylinders, said means being located on the side of said frame; a means for imparting rotation to said cylinders; a housing enclosing the cylinders, said housing comprising three sections, including a lower section, and left-hand section and a right-hand section, one of said cylinders being mounted in the left-hand section of the housing and forming together therewith a separate seed chamber along the entire length of the cylinder, said chamber being wedge-shaped in its cross section and narrowing in the direction of the flow of seeds conveyed by the rotating cylinder; said cylinders and the lower section of the housing forming together a second seed chamber adjacent to said first chamber; the second of said cylinders being mounted in the right-hand section of said housing and forming together a third seed chamber along the entire length of the cylinder, said third chamber being adjacent to the second chamber and incorporating in its top portion a widening made in the form of a longitudinal semicircular duct to create a dense layer of seeds; said duct having an open upper outlet for the lint and seeds being delinted; said right-hand section of the housing of said third seed chamber incorporating at the bottom an integral cylindrical surface coaxial to the surface of the second cylinder having a clearance between said surfaces set within the limits of 11–15 mm; a chamber for a complete separation of lint from the seeds, which is located above said cylinders for receiving the lint and seeds being delinted; and a trough for discharging delinted seeds, said trough being located on the side of said frame which is opposite to a seed-feeding means.

7. A cottonseed delinting machine, comprising: a frame; cylinders mounted on said frame in opposition to each other, capable of unidirectional rotation and carrying on their surface teeth adapted to act on seeds for delinting the seeds during the rotation of said cylinders; a means for feeding seeds to said cylinders, which is positioned on the side of said frame; a means for imparting rotation to said cylinders; a housing enclosing the cylinders and comprising three sections, including a lower section, a left-hand section and a right-hand section, one of said cylinders being mounted in the left-hand section of the housing and forming together therewith a separate seed chamber along the entire length of the cylinder, said chamber having a wedge-shaped cross section narrowing in the direction of the flow of seeds conveyed by said rotating cylinders; said cylinders and the lower section of the housing forming together a second seed chamber which is adjacent to said first chamber; the second of said cylinders being mounted in the right-hand section of said housing to form together therewith a third seed chamber along the entire length of the cylinder which is adjacent to the second chamber and incorporates in its top portion a widening which is made in the form of a longitudinal semicircular duct to create a dense layer of seeds; said duct having an open upper outlet for the lint and seeds being delinted; said right-hand section of the housing of said third seed chamber incorporating at the bottom thereof an integral cylindrical surface coaxial to the surface of the second cylinder having a clearance between said surfaces set within the limits of 11 to 15 mm; a chamber for a complete separation of lint from seeds, which is located above said cylinders for receiving lint and seeds being delinted; a lint cleaning means located above said lintseparating chamber; and a trough for discharging delinted seeds, said trough being located on the side of said frame which is opposite to a seed feeding means.

8. A machine as claimed in claim 7, wherein said lint separating said chamber comprises a left-hand compartment and a right-hand compartment, of which the left-hand compartment is made in the shape of a spiral snail in its top portion, whereas the right-hand compartment incorporates a diffuser which is adjacent to the open outlete of the longitudinal muct so that a slot is made ]long the entire length of the cylinder to receive air from outside.

* * * * *